United States Patent [19]
Kuo

[11] Patent Number: 5,887,950
[45] Date of Patent: Mar. 30, 1999

[54] MODULAR TOY TODDLER CAR SEAT

[76] Inventor: Chun-Mei Kuo, 9F-2, No. 98, Sec. 4, Hsin-I Rd., Taipei City, Taiwan

[21] Appl. No.: 8,842

[22] Filed: Jan. 20, 1998

[51] Int. Cl.$^6$ ....................................................... B60N 2/24
[52] U.S. Cl. .............................. 297/440.13; 297/452.14; 297/452.58; 297/183.6; 297/440.22; 446/482
[58] Field of Search ............................. 297/183.3, 183.4, 297/183.6, 183.2, 183.1, 440.13, 440.2, 440.23, 452.55, 452.58, 452.12, 452.14, 440.22, 452.56, 452.13; 446/482

[56] References Cited

U.S. PATENT DOCUMENTS

| | | | |
|---|---|---|---|
| 2,355,957 | 8/1944 | Davis ........................................ | 446/482 |
| 2,823,737 | 2/1958 | Eriksen ................................. | 297/440.23 |
| 3,431,022 | 3/1969 | Poppe et al. .................... | 297/440.22 X |
| 3,720,444 | 3/1973 | Uthurriague ...................... | 297/440.2 X |
| 4,516,806 | 5/1985 | McDonald et al. ............... | 297/186.6 X |
| 4,634,177 | 1/1987 | Meeker .............................. | 297/183.2 X |
| 4,798,414 | 1/1989 | Hughes ........................... | 297/440.23 X |
| 4,848,843 | 7/1989 | Gibbs ................................ | 297/440.22 |
| 5,454,331 | 10/1995 | Green .............................. | 297/440.13 X |
| 5,651,581 | 7/1997 | Myers et al. ..................... | 297/183.4 X |
| 5,806,924 | 9/1998 | Gonas .............................. | 297/183.6 X |

FOREIGN PATENT DOCUMENTS 1254288  1/1961  France ................................... 446/482

*Primary Examiner*—Peter M. Cuomo
*Assistant Examiner*—David E. Allred
*Attorney, Agent, or Firm*—Nixon & Vanderhye

[57] ABSTRACT

A modular toy toddler car seat includes a seat member, a backrest and two armrests. Each of the armrests is a plastic unitary piece and has an inner surface formed with a generally V-shaped open-ended slide slot and a plurality of blind holes which are located under the slide slot. The seat further includes a plurality of rigid connecting rods, each of which has two ends that are respectively press fitted within an aligned pair of the holes in the armrests. The backrest and the seat member are integrally formed with each other and are formed from a flexible plate which is supported on the rigid connecting rods and which has two opposite sides that are received respectively and slidably within the slide slots in the armrests.

4 Claims, 3 Drawing Sheets

MODULAR TOY TODDLER CAR SEAT

BACKGROUND OF THE INVENTION

1. Field of the Invention

This invention relates to a toy seat, more particularly to a modular toy toddler car seat which can be easily disassembled to facilitate transport and storage.

2. Description of the Related Art

Because a child often brings a doll when riding on a car, a toy toddler car seat has been designed to support a doll on an actual car seat and is fastened to the actual car seat by means of a safety belt. A conventional toy toddler car is integrally formed from plastic, thereby resulting in difficulties in transporting and storing the toy toddler car seat.

SUMMERY OF THE INVENTION

The object of this invention is to provide a modular toy toddler car seat which can be easily disassembled to facilitate transport and storage.

According to this invention, a modular toy toddler car seat includes a seat member, a backrest and two armrests. Each of the armrests is a plastic unitary piece and has an inner surface formed with a generally V-shaped open-ended slide slot and a plurality of blind holes which are located under the slide slot. The seat further includes a plurality of rigid connecting rods, each of which has two ends that are respectively press fitted within an aligned pair of the holes in the armrests. The backrest and the seat member are integrally formed with each other and are formed from a flexible plate which is supported on the rigid connecting rods and which has two opposite sides that are received respectively and slidably within the slide slots in the armrests.

BRIEF DESCRIPTION OF THE DRAWINGS

Other features and advantages of this invention will become apparent in the following detailed description of the preferred embodiment of this invention with reference to the accompanying drawings in which.

DETAILED DESCRIPTION OF THE PREFERRED EMBODIMENT

Figure 1:
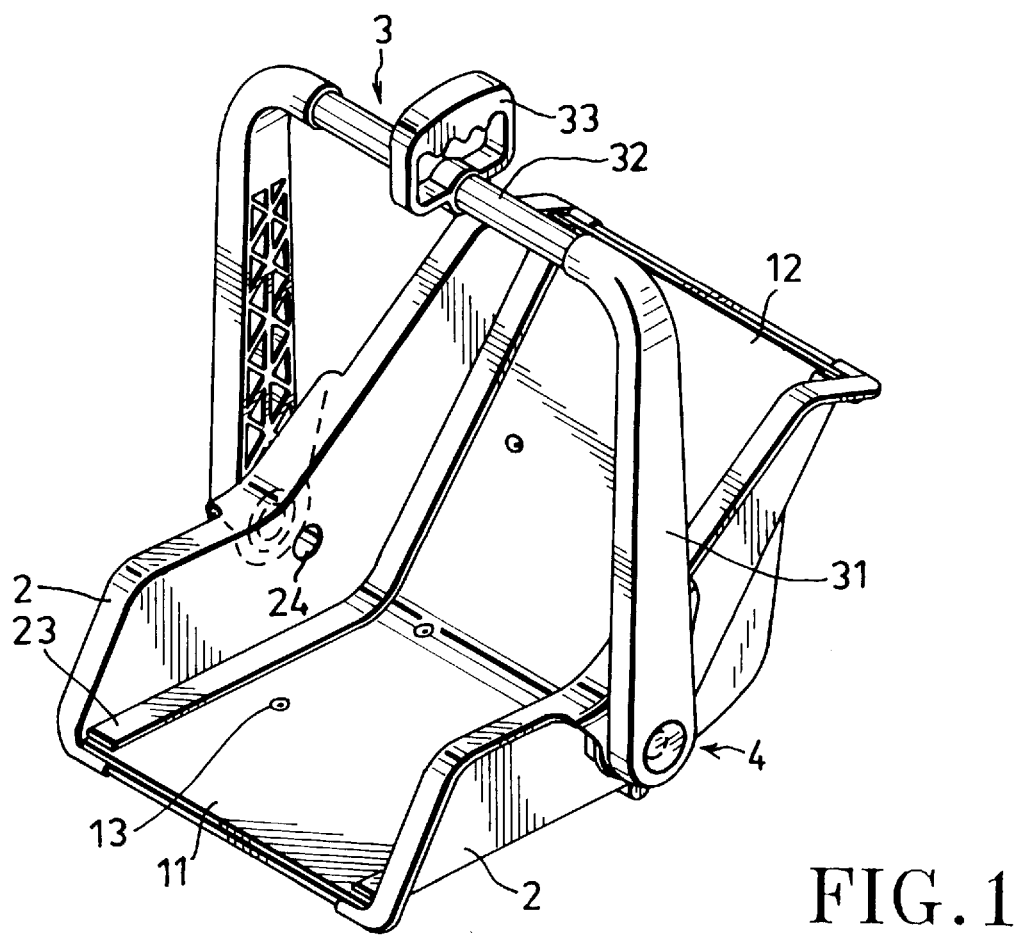
FIG. 1 is an assembled perspective view of a modular toy toddler car seat according to this invention, in which a seat cover is removed for the sake of clarity.
Figure 2:
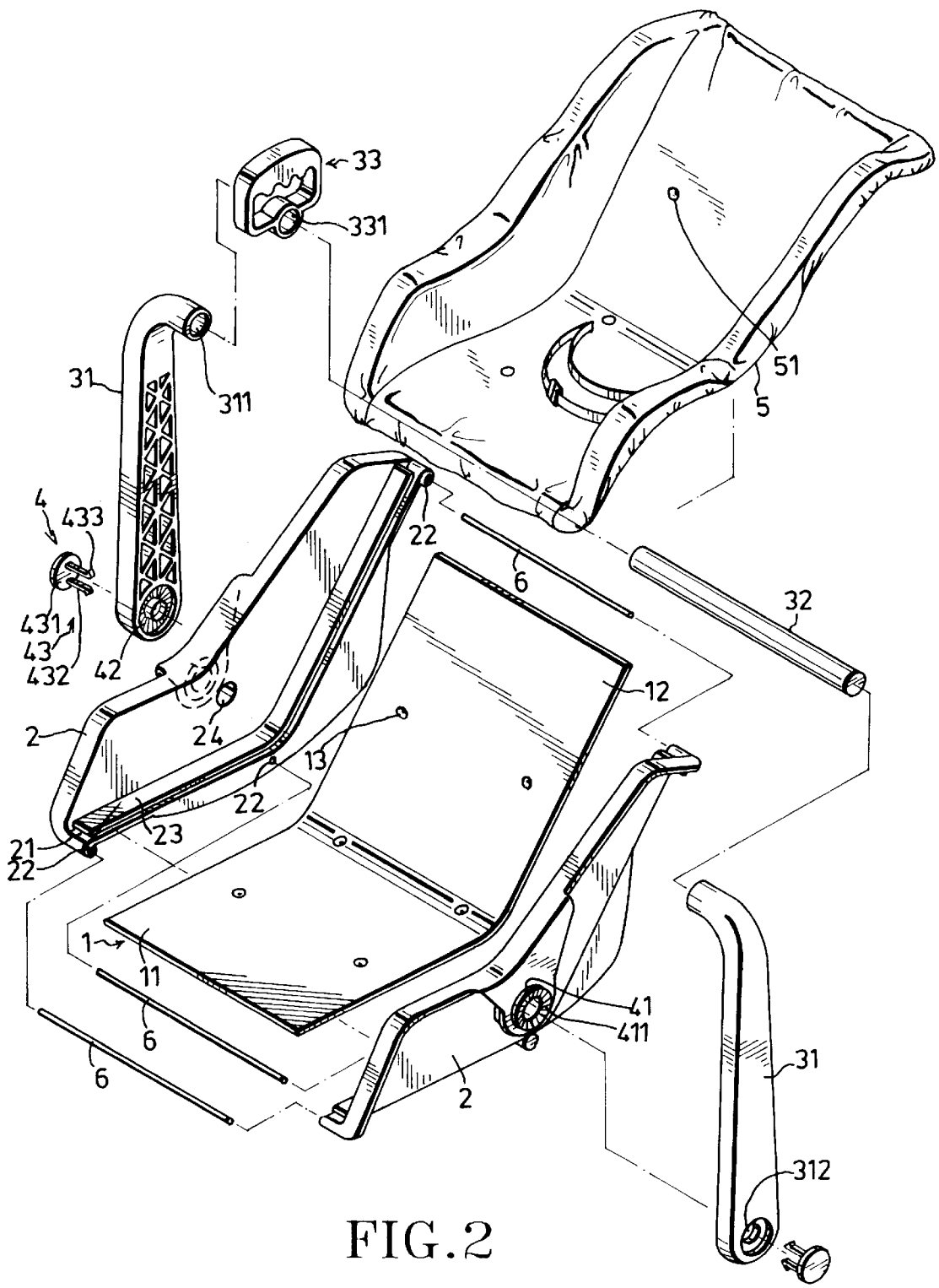
FIG. 2 is an exploded perspective view of the modular toy toddler car seat according to this invention.
Figure 3:
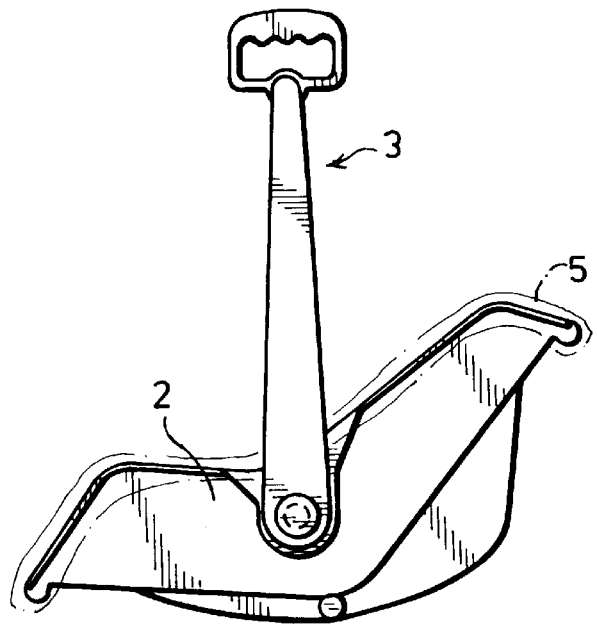
FIG. 3 is an elevational view of the modular toy toddler car seat according to this invention.

Referring to FIGS. 1, 2 and 3, a modular toy toddler car seat of this invention is shown to include a flexible plate 1, two armrests 2, a generally inverted U-shaped handle assembly 3, an angle-adjustable fixing device 4 and a seat cover 5.

The flexible plate 1 includes a seat member 11 and a backrest 12 which are integrally formed with each other.

Each of the armrests 2 is a plastic unitary piece and has an inner surface formed with a generally V-shaped open-ended slide slot 21 and three blind holes 22 which are located under the slide slot 21. The flexible plate 1 has two opposite sides which are received respectively and slidably within the V-shaped open-ended slide slots 21 in the armrests 2. As illustrated, each of the slide slots 21 is defined by two parallel ribs 23 which project integrally from the inner surface of the corresponding armrest 2. The seat further includes three rigid connecting rods 6, each of which has two ends that are respectively press fitted within an aligned pair of the blind holes 22 in the armrests 2.

The handle assembly 3 includes two generally inverted L-shaped rods 31 which are mounted respectively on the armrests 2 by means of the fixing device 4 and which has an upper end portion formed with a horizontally extending blind hole 311 and a lower end portion with a through hole 312 formed therethrough. The handle assembly 3 further includes a horizontal rod 32 which has two ends that are respectively press fitted within the blind holes 311 in the L-shaped rods 31, and a looped handle element 33 which is integrally formed with a sleeve 331 that is sleeved rotatably on the horizontal rod 32.

The angle-adjustable fixing device 4 includes two positioning rings 41 that are formed respectively and integrally with the armrests 2 and that are located around the through holes 312 in the armrests 2, two engagement surfaces 42 that are formed respectively on the L-shaped rods 31 of the handle assembly 3, and two plastic unitary retainers 43, each of which has an abutment plate 431 and two barb-shaped retaining arms 432 that project from a side surface of the abutment plate 431. Each of the positioning rings 41 has a toothed surface 422 which is formed with a plurality of radially extending teeth. Similarly, each of the engagement surfaces 42 has a plurality of radially extending teeth which engage frictionally and respectively the teeth of the toothed surface 411 of the corresponding armrest 2. Each of the retainers 43 fixes one of the L-shaped rods 31 to one of the armrests 2 by inserting the retaining arms 432 through the through hole 312 in the rod 31 and a through hole 24 in the armrest 2 and by clamping the rod 31 and the armrest 2 between a back-curving end 433 of the retaining arm 432 and the abutment plate 431.

The seat cover 5 is made of a soft material, such as cloth, and has an upper surface provided with six snap fasteners 51 (only three are shown in FIGS. 1 and 2) which are fastened thereto and which are connected respectively and removably to six snap fasteners 13 that are fastened to the flexible plate 1, thereby retaining the seat cover 5 on the flexible plate 1.

Figure 4:
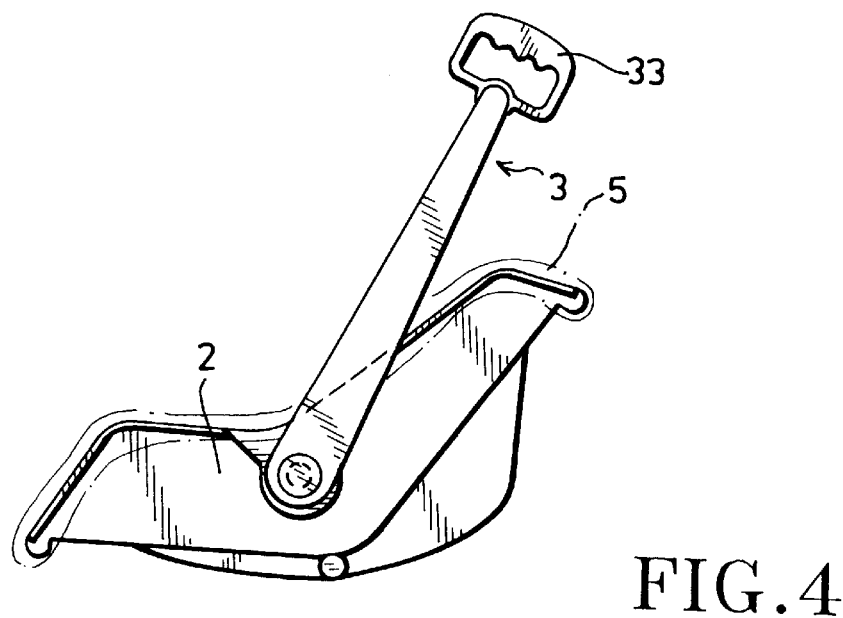
FIG. 4 is a schematic view illustrating how the angle of a handle assembly is adjusted with respect to the remaining portion of the modular toy toddler car seat of this invention.

After the seat cover 5 is removed from the flexible plate 1, the user can push the back-curving ends 433 of the retaining arms 432 of each of the retainers 43 toward each other so as to remove the L-shaped rods 31 from the armrests 2, thereby adjusting the angles of the handle assembly 3 with respect to the armrests 2. In this way, the angle of the handle assembly 3 can be adjusted from that shown in FIG. 3 to that shown in FIG. 4.

With this invention thus explained, it is apparent that numerous modifications and variations can be made without departing from the spirit and scope of this invention. It is therefore intended that this invention be limited only as indicated in the appended claims.

I claim:

1. A modular toy toddler car seat including a seat member, a backrest and two armrests, wherein the improvement comprises each of said armrests being a plastic unitary piece and having an inner surface formed with a generally V-shaped open-ended slide slot and a plurality of blind holes which are located under said slide slot, said seat further including a plurality of rigid connecting rods, each of which has two ends that are respectively press fitted within an aligned pair of said blind holes in said armrests, said backrest and said seat member being integrally formed as one piece and being formed from a flexible plate which is supported on said rigid connecting rods and which has two opposite sides that are received respectively and slidably within said slide slots in said armrests.

2. A modular toy toddler car seat as claimed in claim 1, wherein said flexible plate has an upper surface which is provided with a plurality of snap fasteners that are fastened thereto, said seat further including a seat cover which is made of a soft material and which has a bottom surface that is provided with a plurality of snap fasteners that are fastened thereto and that are connected respectively and removably to said snap fasteners of said flexible plate, thereby retaining said seat cover on said flexible plate.

3. A modular toy toddler car seat as claimed in claim 1, further comprising a generally inverted U-shaped handle assembly and an angle-adjustable fixing device which fixes said handle assembly to said armrests in such a manner that an angle of said handle assembly can be adjusted with respect to said armrests.

4. A modular toy toddler car seat as claimed in claim 3, wherein each of said armrests has a through hole formed therethrough, said handle assembly including two generally inverted L-shaped rods which are mounted respectively on said armrests by means of said fixing device and which has an upper end portion formed with a horizontally extending blind hole and a lower end portion with a through hole formed therethrough, and a horizontal rod having two ends which are respectively press fitted within said blind holes in said L-shaped rods, said angle-adjustable fixing device including:

- two positioning rings formed respectively and integrally with said armrests and surrounding said through holes in said armrests, each of said positioning rings having a toothed surface formed with a plurality of radially extending teeth;
- two engagement surfaces formed respectively on said L-shaped rods of said handle assembly, each of said engagement surfaces having a plurality of radially extending teeth;
- two plastic unitary retainers each of which has an abutment plate that abuts against a surface of a respective one of said L-shaped rods, and two barb-shaped retaining arms that are integrally formed with said abutment plate and that extend through said through hole of a respective one of said armrests and said through hole of a respective one of said L-shaped rods, each of said retaining arms having a barbed end so as to clamp a respective one of said L-shaped rods and a respective one of said armrests between said barbed ends and a corresponding one of said abutment plates, thereby engaging said engagement surfaces of said L-shaped rods of said handle assembly with said toothed surfaces of said positioning rings.

\* \* \* \* \*